UNITED STATES PATENT OFFICE.

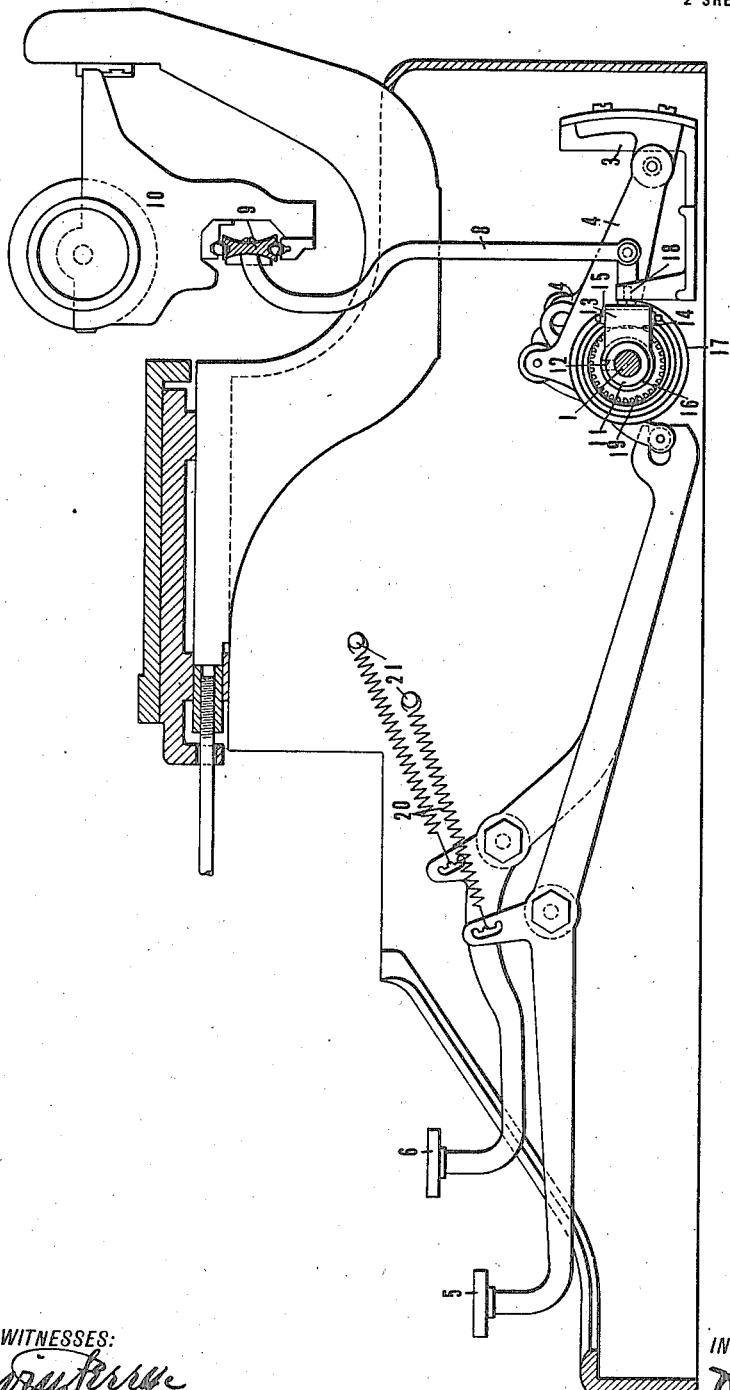

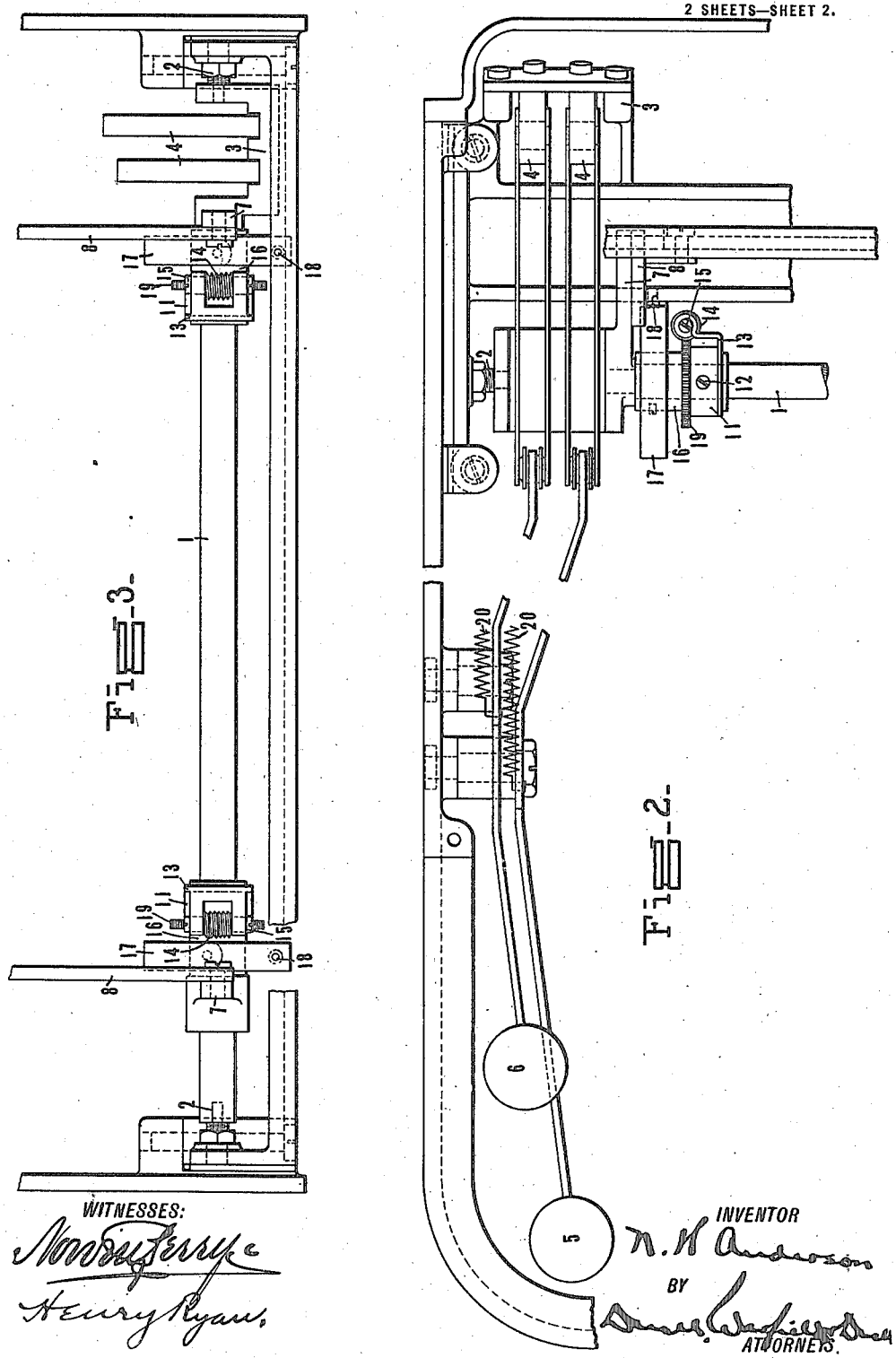

NILS H. ANDERSON, OF MIDDLETOWN, CONNECTICUT, ASSIGNOR TO THE NOISELESS TYPEWRITER COMPANY, OF MIDDLETOWN, CONNECTICUT, A CORPORATION OF CONNECTICUT.

TYPE-WRITING MACHINE.

1,161,181.  Specification of Letters Patent.  Patented Nov. 23, 1915.

Application filed March 17, 1910. Serial No. 550,066.

*To all whom it may concern:*

Be it known that I, NILS H. ANDERSON, a citizen of the United States, residing at Middletown, in the county of Middlesex and State of Connecticut, and whose post-office address is Middletown, Connecticut, have invented certain new and useful Improvements in Type-Writing Machines, of which the following is a full, clear, and exact description, such as will enable others skilled in the art to which it appertains to make and use the same.

This invention relates to typewriting machines, and with regard to the more specific features thereof, to certain features of the platen shifting mechanism.

One of the objects of this invention is to provide practical and efficient means for varying the tension of a balancing spring associated with a rock shaft of the shift mechanism.

Another object is to provide a device of the above character which will be simple in construction and cheap to manufacture.

A further object is to provide a device of the above nature whereby the balancing spring may be easily and minutely adjusted, and at the same time positively locked in adjusted position.

A further object is to provide a spring balance for the shift mechanism that will not be materially altered through its working limits when actuated.

Other objects will be in part obvious and in part hereinafter pointed out.

The invention accordingly consists in the features of construction, combinations of elements and arrangement of parts which will be exemplified in the construction hereinafter set forth, and the scope of the application of which will be indicated in the following claims.

In the accompanying drawings, wherein is shown one of various possible embodiments of this invention, Figure 1 is a side elevation of a part of a typewriting machine sufficient to illustrate one embodiment of this invention; Fig. 2 is a plan view thereof partly in section and with parts removed for the sake of clearness; Fig. 3 is a rear elevation of the same.

Similar reference characters refer to similar parts throughout the several views of the drawings.

The present invention will be illustrated and described with reference to an embodiment thereof in the shift mechanism of a Noiseless typewriting machine, but it is to be understood, of course that the invention may be applied to any form of typewriting machine using a rock shaft in connection with its shift mechanism, either of double or single shift or where the type-basket is shifted relatively to a stationary platen.

Referring to the drawings in detail, 1 represents a rock shaft mounted in suitable trunnions 2 on the inner side of the frame and provided with a yoke 3 near one end thereof in which is mounted cam mechanism 4 adapted to be actuated by shift keys 5 and 6 for rotating the rock shaft 1 in opposite directions. Rigidly connected near each end of the rock shaft 1 is an arm 7 connected by means of links 8 with a shift rail 9 along which a carriage 10 is adapted to travel. As above stated, the shift mechanism is adapted to rotate the rock shaft 1 in opposite directions from a normal intermediate position, which will, through the link mechanism above described, move the carriage upwardly or downwardly for the purpose of printing upper or lower case type. As this mechanism forms no part of the present invention, it need not be further described in this application, reference being had to my co-pending application No. 429,408, filed April 27, 1908.

Near each end of the rock shaft 1 is secured a sleeve or bushing 11 by means of a set screw 12, said sleeve having a bracket or ear 13 in which is mounted a worm 14. A screw head 15 is provided at one end thereof whereby the same may be rotated by means of a screw driver or the like, when desired. Loosely mounted upon shaft 1 is a sleeve or bushing 16 to which one end of a balancing spring 17 is attached, the opposite end of this spring being connected to any suitable part of the frame 18, as clearly shown in Fig. 1. Secured to the bushing or sleeve 16 is a pinion 19 adapted to mesh with the worm 14. It is thus seen that when the worm is rotated, pinion 19 and sleeve 16 will turn also, either increasing or decreasing the tension of the spring, according to the direction in which the worm is turned. It is to be understood, of course, that as the carriage shifts in opposite directions from the intermediate position shown in Fig. 1, it will be returned to normal position by means of springs 20 connected at one end to the shift levers 5 and 6 and at their opposite ends to suitable pins 21 on the frame of the machine and locked in that position by the cam mechanism 4.

When the carriage is shifted upwardly the weight of the carriage assists in returning it to its central neutral position so that in this case the return spring can be relatively somewhat lighter than when shifting the carriage to the lower position, in which case the return spring must overcome the weight of the carriage as well as the balance of the mechanism. In this latter case the balancing springs act to a certain extent in assisting the return but on account of their great length there is little or no real effect from this cause. The balance springs as applied are not intended to act as return springs for the up and down motion of the carriage, nor do they act to maintain the carriage in a neutral position. The principal function of these springs is to balance or neutralize the weight of the carriage so as to afford an easy-working shift mechanism. The use of the spiral spring as shown is important in this respect since it provides a very long spring in which the relatively slight movement due to the shifting has little or no effect on the tension thereof. In some forms of typewriters a common helical spring has been used for this work but it has heretofore been found difficult to introduce a spring of this type of sufficient length so that the movement of the shifting would not result in too large an increase or decrease in the tension of the spring. By shifting the carriage in opposite directions from a normal intermediate position an overtension of the balance springs is thereby prevented.

The operation and manner of use of this invention is substantially as follows: The rock shaft is rotated in one direction or the other, according to which shift key is pressed, to raise or lower the carriage in order to print upper or lower case type. Assume that for some reason it is necessary to adjust the tension of the spring to properly balance the carriage, a screw driver is inserted in the head 15 of the worm 14 mounted in the bushing 13 fast on the rock shaft 1, and rotated so as to turn the pinion 19 meshing therewith in one direction or the other, so that the tension of the spring is such as to properly balance the carriage when the parts are in normal position. The operator will know when this condition is reached, as it may be easily determined by actuating the shift mechanism and noting the action of the carriage in returning to normal position. It will, of course, be noted that it is unnecessary to loosen any nuts or the like before commencing this adjustment or to perform any act whatsoever after the adjustment has been made to insure that the parts are securely locked in adjusted position, as the worm and pinion mechanism is such that one locks the other against movement until some exterior force is applied thereto.

It is thus seen that this invention provides for a simple and practical device which will permit accurate adjustment of the parts with the least amount of trouble, and also that the adjusting means is locked in its adjusted position the instant that position has been reached.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim as new and desire to secure by Letters Patent is:

1. In a typewriting machine, in combination, shift mechanism including a rock shaft, a balancing spring on said rock shaft, a pinion connected with one end of said spring, and a worm fast on said shaft meshing with said pinion whereby the tension of the spring may be varied.

2. In a typewriting machine, in combination, a rock shaft, a sleeve on said shaft, a balancing spring, one end of which is connected with the frame of the machine and the other to said sleeve, and means for rotating said sleeve whereby the tension of said spring is varied.

3. In a typewriting machine, in combination, a rock shaft, a sleeve on said shaft, a balancing spring, one end of which is connected with the frame of the machine and the other to said sleeve, and worm and pinion mechanism for turning said sleeve whereby the tension of said spring is varied.

4. In a typewriting machine, in combination, a rock shaft, a sleeve on said shaft, a balancing spring, one end of which is connected with the frame of the machine and the other to said sleeve, a pinion rigidly connected with said sleeve, and a worm adapted to rotate the pinion whereby the tension of said spring is varied.

5. In a typewriting machine, in combination, a rock shaft, a sleeve on said shaft, a balancing spring, one end of which is connected with the frame of the machine and the other to said sleeve, a pinion connected with said sleeve, an ear rigidly secured to said shaft, a worm carried thereby and rotatably connected therewith, and means for rotating said worm whereby said pinion is turned to vary the tension of said spring.

6. In a typewriting machine, in combination, a carriage, a rail along which said carriage travels and which is shiftable in opposite directions from a normal central position, a rock shaft, intermediate mechanism for transmitting motion from one to the other, sleeves on said shaft, a spring connected at one end to each sleeve and having its other end connected to the frame, and means for adjusting the tension of said spring.

7. In a typewriting machine, in combination, a carriage, a rail along which said carriage travels and which is shiftable in opposite directions from a normal central position, a rock shaft, intermediate mechanism for transmitting motion from one to the other, sleeves on said shaft, a spring connected at one end to each sleeve and having its other end connected to the frame, and means for rotating said sleeves whereby the tension of the springs is varied.

8. In a typewriting machine, in combination, a carriage, a rail along which said carriage travels and which is shiftable in opposite directions from a normal central position, a rock shaft, intermediate mechanism for transmitting motion from one to the other, sleeves on said shaft, a spring connected at one end to each sleeve and having its other end connected to the frame, and worm and pinion mechanism for turning said sleeves whereby the tension of the springs is varied.

9. In a typewriting machine, in combination, a carriage, a rail along which said carriage travels and which is shiftable in opposite directions from a normal central position, a rock shaft, intermediate mechanism for transmitting motion from one to the other, sleeves on said shaft, a spring connected at one end to each sleeve and having its other end connected to the frame, a pinion rigidly connected with each sleeve, and worms connected with said shaft adapted to rotate the pinions whereby the tension of the springs is varied.

10. In a typewriting machine, in combination, a carriage, a rail along which said carriage travels and which is shiftable in opposite directions from a normal central position, a rock shaft, intermediate mechanism for transmitting motion from one to the other, sleeves on said shaft, a spring connected at one end to each sleeve and having its other end connected to the frame, a pinion connected with each sleeve, ears rigidly secured to said shaft, worms carried thereby, and means for rotating said worms whereby said pinions are turned to vary the tension of the springs.

11. In a typewriting machine, in combination, a shiftable carriage, a rail on which said carriage travels, a rock shaft, intermediate mechanism between the rock shaft and said rail, a sleeve on said shaft, a spring having one end connected with said sleeve and the other with the frame, and means for adjusting the tension of said spring.

12. In a typewriting machine, in combination, a vertically shiftable carriage, a rail on which said carriage travels, a rock shaft, intermediate mechanism between the rock shaft and said rail, a sleeve on said shaft, a spring having one end connected with said sleeve and the other with the frame, and means whereby the tension of said spring is varied.

13. In a typewriting machine, in combination, a shiftable carriage, a rail on which said carriage travels, a rock shaft, intermediate mechanism between the rock shaft and said rail, a sleeve on said shaft, a spring having one end connected with said sleeve and the other with the frame, and worm and pinion mechanism whereby the tension of said spring is varied.

14. In a typewriting machine, in combination, a shiftable carriage, a rail on which said carriage travels, a rock shaft, intermediate mechanism between the rock shaft and said rail, a sleeve on said shaft, a spring having one end connected with said sleeve and the other with the frame, a pinion rigidly connected with said sleeve, and a worm connected with said shaft adapted to rotate the pinion whereby the tension of said spring is varied.

15. In a typewriting machine, in combination, a shiftable carriage, a rail on which said carriage travels, a rock shaft, intermediate mechanism between the rock shaft and said rail, a sleeve on said shaft, a spring having one end connected with said sleeve and the other with the frame, a pinion connected with said sleeve, an ear on said shaft, a worm carried thereby, and means for rotating said worm whereby one of said parts is turned to vary the tension of said spring.

16. In a typewriting machine, in combination, shift mechanism including a rock shaft, a sleeve on said shaft, a spring having one end connected to said sleeve and the other to a relatively fixed part of the machine, a pinion connected with said sleeve, and a single means for adjusting the tension of said spring through said pinion and locking the same in adjusted position.

17. In a typewriting machine, in combination, shift mechanism including a rock shaft, a sleeve on said shaft, a spring having one end connected to said sleeve and the other to a relatively fixed part of the machine, a pinion connected with said sleeve, and a worm meshing with said pinion for rotating the same to adjust the tension of said spring and lock the same in adjusted position.

18. In a typewriting machine, in combination, shift mechanism including a rock shaft, a sleeve on said shaft, a spring having one end connected to said sleeve and the other to a relatively fixed part of the machine, a pinion connected with said sleeve, a bushing fast on said rock shaft, and a worm carried thereby meshing with said pinion for adjusting the spring and locking the same in adjusted position.

19. In a typewriting machine, in combination, a rotatable shaft, a spring about said shaft adapted to return the same to normal position when tensioned, a sleeve on said shaft to which said spring is connected at one end, a pinion on said sleeve, and means meshing with said pinion for rotating the same to adjust the tension on said spring.

20. In a typewriting machine, in combination, a rotatable shaft, a spring about said shaft, a sleeve on said shaft to which said spring is connected at one end, a pinion on said sleeve, and means adapted to mesh with said pinion to rotate the same to vary the tension on said spring.

21. In a typewriting machine, in combination, a rotatable shaft, a spring about said shaft, a sleeve on said shaft to which said spring is connected at one end, a pinion on said sleeve, a second sleeve, and a worm mounted thereon adapted to mesh with said pinion to rotate the same and vary the tension of said spring.

22. In a typewriting machine, in combination, a rotatable shaft, a spring about said shaft, a sleeve on said shaft to which said spring is connected at one end, a pinion mounted on said sleeve, a second sleeve fast on said shaft, and a worm carried thereby adapted to mesh with said pinion to rotate the same and vary the tension of said spring.

23. In a typewriting machine, in combination, a rotatable shaft, a spring about said shaft, a part of said shaft to which said spring is connected at one end, a pinion mounted on said sleeve, a second part on said shaft, and a worm carried thereby adapted to mesh with said pinion to rotate the same and vary the tension of said spring.

24. In a typewriting machine, in combination, a rotatable shaft, a spring about said shaft, a sleeve on said shaft to which said spring is connected at one end, a pinion mounted on said sleeve, a second sleeve on said shaft, a worm adapted to mesh with said pinion to rotate the same and vary the tension of said spring, and means whereby said worm may be rotated.

In testimony whereof I affix my signature, in the presence of two witnesses.

NILS H. ANDERSON.

Witnesses:
  EDMUND H. CLARK,
  GRACE E. FLANDERS.